C. E. STRAUSSER.
COUPLING.
APPLICATION FILED JAN. 20, 1916.
1,200,266.
Patented Oct. 3, 1916.
2 SHEETS—SHEET 1.
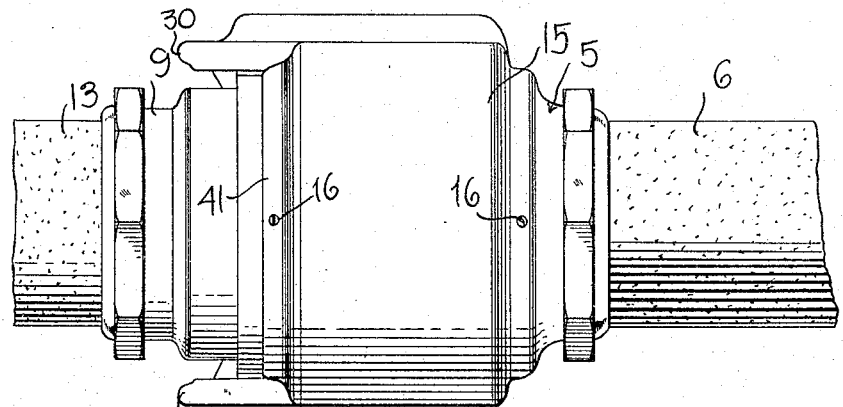
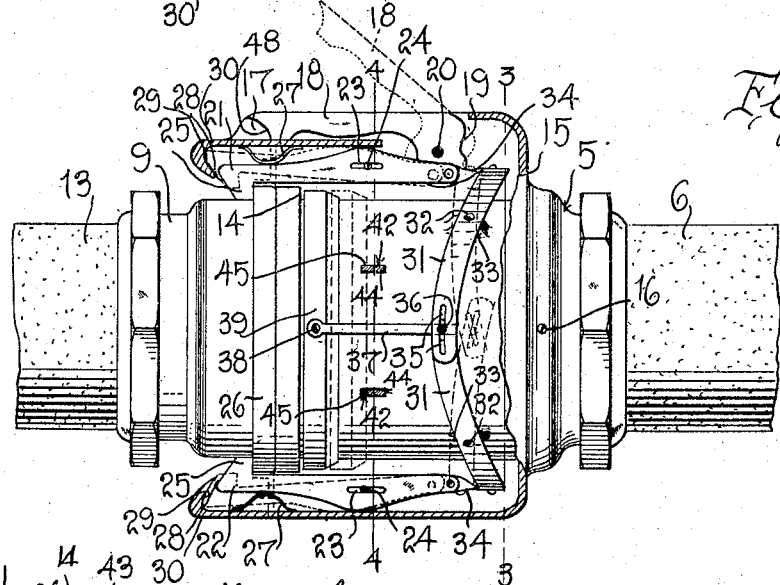
Inventor
CLAYTON E. STRAUSSER
By Watson E. Coleman
Attorney C. E. STRAUSSER.
COUPLING.
APPLICATION FILED JAN. 20, 1916.
1,200,266. Patented Oct. 3, 1916.
2 SHEETS—SHEET 2.
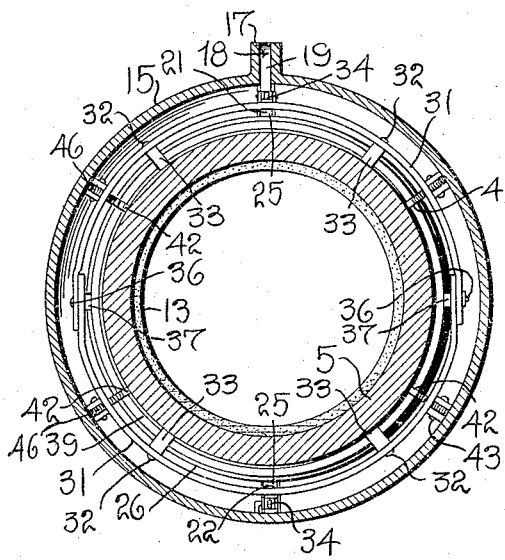
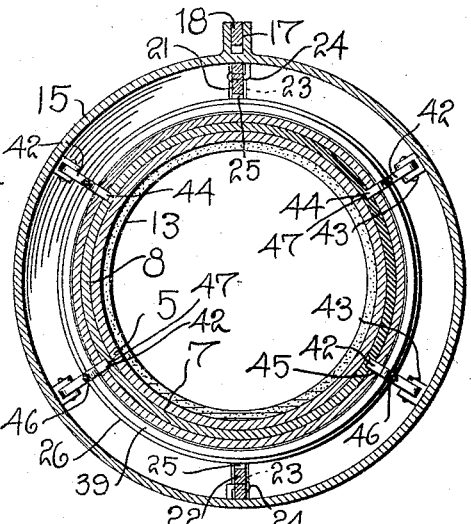
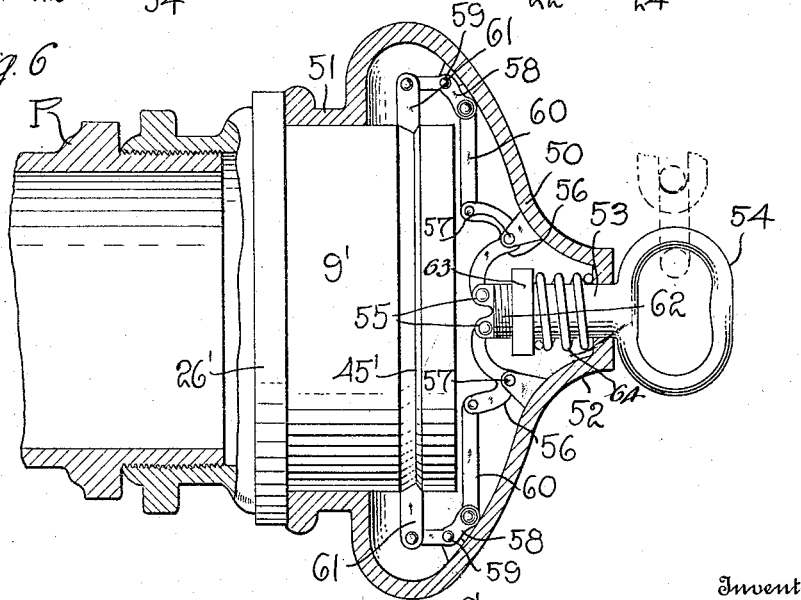
Inventor
CLAYTON E. STRAUSSER
By Watson E. Coleman
Attorney

UNITED STATES PATENT OFFICE.

CLAYTON E. STRAUSSER, OF MOUNT CARMEL, PENNSYLVANIA.

COUPLING.

1,200,266. Specification of Letters Patent. Patented Oct. 3, 1916.

Application filed January 20, 1916. Serial No. 73,213.

*To all whom it may concern:*

Be it known that I, CLAYTON E. STRAUSSER, a citizen of the United States, residing at Mount Carmel, in the county of Northumberland and State of Pennsylvania, have invented certain new and useful Improvements in Couplings, of which the following is a specification, reference being had to the accompanying drawings.

This invention relates to an improved coupling and has for its primary object to provide simple and effective coupling means for fire hose and the like, wherein the use of screw threads for forming the connection between the coupling members is entirely dispensed with.

The invention has for a more particular object to provide a device of the above character embodying male and female coupling members, locking dogs on the male coupling member to coöperatively engage with the female coupling member and hold said members in assembled relation, auxiliary means on the male member also having locking engagement with the female member, means for releasing the locking dogs, and means connected to said locking dogs and operable simultaneously therewith to release the auxiliary locking means.

It is a further general object of the invention to devise a coupling device of the above character which is so constructed that the hose sections can be very quickly and securely coupled together, and a fluid-tight joint produced between the same, said device consisting of a minimum number of parts which are all of simple form and not liable to get out of order.

With the above and other objects in view, my invention consists in the novel features of construction, combination and arrangement of parts to be hereinafter more fully described, claimed and illustrated in the accompanying drawings, in which, Figure 1 is a side elevation of my improved hose coupler, the coupling heads or members being connected; Fig. 2 is a similar view, partly in section, and showing the locking dogs in dotted lines in their released positions; Fig. 3 is a transverse section taken on the line 3—3 of Fig. 2; Fig. 4 is a similar view taken on the line 4—4 of Fig. 2; Fig. 5 is an enlarged detail section showing the auxiliary dogs in their locking positions; and Fig. 6 is a sectional view of a hydrant nozzle with a closure cap or cover applied thereto.

Referring in detail to the drawings, 5 designates the male coupling head, to which one end of the hose length, indicated at 6, is securely connected or attached in any approved manner. This male coupling head is provided in its wall and at its outer end with a longitudinally extending annular groove or channel 7 into which the reduced longitudinally projecting lip or extension 8 formed upon the female coupling head 9, is adapted to be fitted. An annular packing ring or gasket 10 is arranged in the inner end of the groove 7. The female coupling 9 is also provided at the inner end of the lip 8 thereon with an internal annular groove 11 to receive a packing ring 12. To the head 9, a hose length 13 is connected. The male coupling head 5 is also provided on its outer end with an exterior annular shoulder 14, the purpose of which will be hereinafter explained.

A cylindrical housing or casing 15 is fitted upon the coupling head 5 and secured thereto by means of the screws, indicated at 16. This casing 15 is formed with spaced parallel longitudinally extending walls providing a channel-shaped pocket 17. This pocket accommodates an operating lever 18, the inner end of which is angularly disposed, as at 19, and extends inwardly into the casing 15, said angular end of the lever being pivoted, as at 20, between spaced ears projecting inwardly from the wall of the casing 15. To this inwardly extending end of the lever 18, the inner end of a longitudinally disposed locking dog 21 is pivotally connected. A similar locking dog 22 is arranged within the casing 15 in diametrically opposed relation to the dog 21. Each of these dogs is provided intermediate of its ends with a longitudinal slot 23 to receive a pin 24 fixed in the wall of the casing 15 and upon which the dog is adapted to rock. At its outer end, each dog is formed with an inwardly projecting lug 25 for engagement over an endless shoulder or flange 26 formed upon the female coupling head 9. A bowed leaf spring 27 is also secured to each of the dogs at its outer end, said spring bearing at its extremities against the casing wall and yieldingly acting to force the outer end of the dog inwardly. The outer end faces of these dogs are obliquely inclined, as indicated at 28, and are adapted to co-act with a similarly inclined face 29 on an obliquely disposed inwardly extending flange 30 formed upon the outer end of the wall of the casing 15.

Arranged within the casing 15 and upon each side of the male coupling head 5, is a pair of levers 31 which are longitudinally curved as shown and fulcrumed intermediate of their ends, as at 32 upon a lug or projection 33 on the wall of the coupling member. The outer ends of the corresponding levers are connected by strap bars 34 to the inner ends of the respective locking dogs 21 and 22. The opposed ends of the levers 31 in each pair are longitudinally slotted as at 35, to receive a connecting pin 36 fixed in one end of a longitudinally extending arm or bar 37. The other ends of these bars 37 are fixed, as at 38, to diametrically opposite sides of a ring or annulus 39 which surrounds the male coupling head inwardly of and adjacent to the shoulder 14 thereon. The inner edge of this ring is chamfered or beveled, as at 40, for a purpose to be presently explained.

The outer edge of the wall of the casing 15 is inwardly offset or reduced in diameter, as at 41, and rests upon the outer edge of the coupling member 5. Upon the inner face of the inwardly projecting wall of this casing, the auxiliary locking dogs 42 are fulcrumed at one of their ends, as at 43. Preferably, a pair of these locking dogs are mounted in the casing 15 on each side thereof between the main locking dogs 21 and 22. At its free end, each of the dogs 42 is formed with a V-shaped projection 44 normally fitting within and through a similarly shaped opening 45 in the wall of the coupling member 5 which communicates with the annular channel or groove 7 in said wall. A coil spring 46 normally acts to force the dog inwardly into the opening 45, said spring being disposed between the free end of said dog and the wall of the casing 15. It will be observed, from reference to Fig. 2, that in this normal position of the auxiliary locking dogs 42, the lower longitudinal edges thereof are disposed contiguous to the chamfered or beveled edge 40 of the annulus 39. The apex of each of the V-shaped projections 44 on the dogs 42 is adapted for locking engagement in an annular groove 47 formed in the lip or extension 8 on the female coupling member 9.

The operating lever 18 is adapted to be entirely disposed within the channel-shaped pocket 17 on the wall of the casing 16 when in its effective locking position, as shown in full lines in Fig. 2, and the free end of this lever is curved, as shown at 48, and provides a convenient finger receiving recess between the parallel walls of the pocket 17. Thus, no portion of the lever projects beyond the pocket walls to be accidentally engaged or struck in dragging the hose over the ground, whereby said lever might be moved to its released position.

In the operation of the invention as above described, assuming that the heads are uncoupled and the locking elements in the positions shown in dotted lines in Fig. 2, in order to connect the two hose sections, the lip or extension 8 on the female head 9 is inserted into the channel or groove 7 in the head 5 and against the packing ring 10. Inwardly of the groove 7, the outer end of the wall of the coupling head 5 bears against the packing ring 12, while outwardly of said groove the wall of the head 5 abuts tightly against the face of the annular rib or shoulder 26 on the female head 9. The operator now forces the lever 18 inwardly into the pocket 17 on the casing 15. The angular pivoted end 19 of this lever imparts an inward longitudinal movement to the locking dog 21 to which said lever is connected, which, in turn, through the lever connections 31, moves the other dog 22 in a similar manner. The springs 27 act to force the outer ends of the dogs inwardly so that the lugs 25 will engage behind the annular rib or shoulder 26. Simultaneously with this action of the locking dogs 21 and 22, the ring or annulus 39 is shifted outwardly upon the coupling head 5 through the medium of the levers 31 and the bars 37, as will be readily understood. The beveled edge 40 of this ring is thus moved away from the auxiliary locking dogs 42 and the springs 46 then act to force said dogs inwardly through the openings 45 in the coupling member 5 and into the annular groove 47 in the female coupling member. Thus, each of the coupling heads is positively held against any relative movement with respect to the other, and a double security is afforded against the accidental separation or uncoupling of the hose sections.

The reverse of the above operation moves the locking dogs to their released positions. Thus, when the free end of the lever 18 is pulled outwardly from the pocket on the casing 15, the dogs 21 and 22 are shifted forwardly in the casing 15. The beveled end faces 28 of these dogs strike against the inclined inner faces 29 of the flanges 30 so that the dogs will be forced outwardly against the action of the springs 27 and the lugs 26 thus disengaged from the shoulder or rib 26. Concurrently with the release of the dogs 21 and 22, the levers 31 and bars 37 act to draw the annulus 40 inwardly upon the coupling member 5 so that the beveled edge of said annulus bearing against the inclined edges of the dogs 42, will lift said dogs or force the same outwardly through the openings 45 in the coupling member against the action of the springs 46. Thus, the coupling heads are released so that they may be readily disconnected or separated. As the coupling or uncoupling of the heads requires the manual actuation of only a single element, namely, the lever 18, it will be appreciated that the connection of fire hose sections to each other can be effected with great facility as well as with every assurance that the proper coupling of the heads has been produced so that all liability of the same becoming accidentally disconnected is obviated.

In Fig. 6 of the drawings, I have shown an improved cap or closure for a hydrant or hose pipe nozzle. The end of the pipe, indicated at P, is exteriorly threaded, and upon the same the coupling member 9' is adapted to be detachably engaged. This coupling member is of the same construction as the female coupling member above described with the exception, of course, that the same is provided with internal screw threads at one end. 50 designates the cap or cover for the open end of the coupling member 9', and this cover may be of any desired ornamental configuration, but the wall thereon at one end is inwardly curved and then longitudinally extended, as at 51, to fit snugly upon the coupling member 9 and against the annular shoulder or rib 26' thereon. The medial portion of the cap 50 is of bulbous or spherical formation and said wall is gradually contracted and formed with an outwardly projecting tubular boss 52 having a central opening in which an operating rod 53 is slidably mounted. The outer end of said rod is formed with a finger loop 54 to which one end of a chain may be connected, the other end of the chain being suitably fixed or anchored in a wall. To spaced ears 55 on the inner end of the rod 53, bell crank levers 56 are pivotally connected at one of their ends, said levers being fulcrumed, as at 57, between ears projecting from the wall of the cap or cover 50. At the point of greatest diameter of the lever 50, additional levers 58 are pivoted intermediate of their ends upon the cover wall, as at 59, and links 60 connect one end of each of these levers to the other ends of the respective bell crank levers 56. Locking dogs 61 are fixed to the other ends of the levers 58 and project inwardly in a radial direction from said levers. The inner ends of these dogs are adapted for locking engagement in the circumferential groove or channel 45' formed in the periphery of the coupling member 9'. The inner end of the rod 53 is threaded, as at 62, to receive a nut 63, and between this nut and the end wall of the boss 52 on the cap or cover a coil spring 64 is arranged upon the rod 53. This spring normally acts to force the rod inwardly and hold the dogs 61 in their locking positions within the groove or channel 45' of the coupling member. It will be understood that, when it is desired to connect the hose to the supply pipe or hydrant nozzle, it is only necessary to pull the rod 53 outwardly against the action of the spring 64, whereby the lever and link connections to the dogs 61 are actuated and said dogs disengaged from the coupling member, thus permitting the cap or cover to be removed therefrom.

From the foregoing description, taken in connection with the accompanying drawings, the construction, manner of operation and several advantages of my invention will be clearly and fully understood. It will be seen that I have entirely dispensed with the use of screw threads for forming the connection between the coupling members, so that the parts do not have to be turned or rotated, and by providing a multiplicity of locking elements actuated in the movement of a single lever, a very secure and effective locking connection between the coupling heads may be very quickly effected. The several concomitant parts of the device are all of simple form and can be produced at relatively small cost. All of the operating elements are completely housed and protected so that they will be in no wise injured by dragging or pulling the hose over the ground but will remain effective and reliable in their action until the hose is completely worn out.

While I have shown and described the preferred construction and arrangement of the several parts, it is to be understood that the device is susceptible of many modifications therein and I, therefore, reserve the privilege of adopting all such legitimate changes as may be fairly embodied within the spirit and scope of the invention as claimed.

Having thus fully described my invention, what I desire to claim and secure by Letters Patent is:—

1. In combination with male and female coupling heads, primary locking means on one of said heads for locking engagement with the other coupling head, auxiliary locking means on the first head for locking engagement with said second named coupling head, and means for simultaneously actuating the primary and auxiliary locking means to disconnect said coupling heads.

2. In combination with male and female coupling heads, primary locking means on one of said heads for locking engagement with the other coupling head, auxiliary locking means on the first head for locking engagement with said second named coupling head, and means for simultaneously actuating the primary and auxiliary locking means to disconnect said coupling heads, said means including a single manually operable element.

3. In combination with male and female coupling heads, primary locking means on one of said heads for locking engagement with the other coupling head, auxiliary locking means on the first head for locking engagement with said second named coupling head, and means for simultaneously actuating the primary and auxiliary locking means to disconnect said coupling heads, said means including a pivotally mounted operating lever.

4. In combination with male and female coupling heads, primary locking means carried by one of said heads for locking engagement with the other coupling head, auxiliary locking means carried by the first head for locking engagement with said second named head, a shiftable element mounted on the first named head, manually operable means for actuating the first named locking means to release the coupling heads, and means operatively connecting said first named locking means to said shiftable element whereby the latter is simultaneously actuated to operate the auxiliary locking means.

5. In combination with male and female coupling heads, primary locking means carried by one of the coupling heads for engagement with the other head, auxiliary means for locking the heads together, a longitudinally shiftable element to actuate the latter locking means and release the heads, means coöperatively connecting the primary locking means to said shiftable element, and means for operating said primary locking means and thereby simultaneously actuating the auxiliary locking means to release the coupling heads.

6. In combination with male and female coupling heads, primary locking means carried by one of said heads, auxiliary locking means carried by said head, means normally acting to hold each of said locking means in coöperative locking engagement with the other coupling head, manually operable means for actuating the primary locking means to move the same to its released position, and means operatively connected to said primary locking means and actuated thereby to simultaneously move the auxiliary locking means to its released position whereby the heads may be disconnected.

7. In combination with male and female coupling heads, movable locking dogs mounted upon one of said heads for locking engagement with the other head, means normally acting to hold the dogs in a locking position, auxiliary locking dogs mounted upon one of the heads, means normally acting to hold the latter dogs in their locking positions in engagement with the other head, manually operable means to actuate the first named dogs to move the same to their released positions, and means operatively connected to said latter means to simultaneously move the auxiliary dogs to their released positions.

8. In combination with male and female coupling heads, a pair of movable locking dogs mounted upon one of said heads for locking engagement with the other head, means coöperatively connecting said dogs, means normally acting to hold the dogs in their locking positions, auxiliary locking dogs mounted upon the said one of the coupling heads, means acting upon the latter dogs to normally hold the same in locking engagement with the other coupling head, means operatively connected to the connecting means between said first named locking dogs to engage and move the auxiliary locking dogs to their released positions, and manually operable means for actuating said locking dogs.

9. In combination with male and female coupling heads, a pair of locking dogs mounted upon the male coupling head, means acting to normally hold the dogs in locking engagement with the female coupling head, means coöperatively connecting said dogs, auxiliary locking dogs mounted upon one of the heads, means acting to normally hold said latter dogs in locking engagement with the other head, a longitudinally shiftable element mounted upon the male coupling member and operatively connected to the connecting means between said first named locking dogs, and manually operable means for actuating the first named dogs and simultaneously shifting said element to cause the same to engage and release the auxiliary locking dogs whereby the coupling heads may be disconnected.

10. In combination with male and female coupling heads, a pair of movable locking dogs mounted upon the male coupling head, means acting to normally hold said dogs in locking engagement with the female head, levers coöperatively connecting the dogs to each other, auxiliary locking dogs mounted upon the male coupling head, means acting to normally hold the latter dogs in locking engagement with the female head, an annulus longitudinally shiftable on the male coupling head, means connecting said annulus to said levers, and an operating lever connected to one of the first named dogs adapted to simultaneously actuate said dogs and release the coupling heads.

11. In combination with male and female coupling heads, a pair of longitudinally shiftable and pivotally movable locking dogs mounted upon the male coupling head, means operatively connecting said dogs to each other, means acting to normally hold said dogs in locking engagement with the female coupling head, means for shifting said dogs longitudinally in one direction, said dogs and the male coupling head being provided with co-acting means operating when the dogs are shifted to move the dogs to their released positions against the action of said holding means.

12. In combination with male and female coupling heads, a casing fixed upon the male coupling head, pivotally mounted longitudinally shiftable dogs arranged within said casing, means coöperatively connecting said dogs to each other, means acting to yieldingly hold said dogs in their locking positions, said casing having inwardly projecting flanges on one end, and an operating lever pivotally mounted upon the casing and connected to one of the dogs to shift said dogs longitudinally in one direction, said dogs co-acting with said flanges and being moved thereby to their released positions against the action of said holding means.

13. In combination with male and female coupling heads, a casing fixed upon the male coupling head, pivotally mounted longitudinally shiftable dogs arranged within said casing, means coöperatively connecting said dogs to each other, means acting to yieldingly hold said dogs in their locking positions, said casing having inwardly projecting flanges on one end, auxiliary locking dogs pivotally mounted within said casing, means yieldingly holding said dogs in locking engagement with the female coupling head, a shiftable element mounted upon the male coupling head, means operatively connecting said element to the connecting means between said first named dogs, and a single operating lever mounted in the casing and connected to one of the first named dogs to shift the first named dogs longitudinally into engagement with the flanges, whereby the dogs are directed out of locking engagement with the female coupling head, the connections between said dogs and said shiftable element actuating the latter to simultaneously engage the same with the auxiliary dogs and move said latter dogs out of locking engagement with the female coupling head.

14. In combination with male and female coupling heads, a plurality of locking dogs pivotally mounted upon the male coupling head, said female head being provided with means for locking engagement by the dogs, an annulus surrounding the male head, and manually operable means connected to said annulus to shift the same longitudinally upon the coupling head into bearing engagement with the dogs to move said dogs out of locking engagement with the female coupling head.

15. In combination with male and female coupling heads, said male head being provided with a plurality of spaced openings, and said female head having spaced recesses in its wall to coincide with said openings, spring pressed pivotally mounted locking dogs on the male head, normally extending through the openings therein and adapted for locking engagement in the recesses in the wall of the female head, an annulus longitudinally shiftable upon the male coupling head to coact with said dogs and disengage the same from the recesses in the female coupling head, and manually operable means connected to said annulus for actuating the same.

In testimony whereof I hereunto affix my signature in the presence of two witnesses.

CLAYTON E. STRAUSSER.

Witnesses:
ELIAS STRAUSER,
EMERSON C. KLINGER.

Copies of this patent may be obtained for five cents each, by addressing the "Commissioner of Patents, Washington, D. C."